US011774689B2

(12) United States Patent
Pawlak et al.

(10) Patent No.: US 11,774,689 B2
(45) Date of Patent: Oct. 3, 2023

(54) PHOTONICS CHIPS AND SEMICONDUCTOR PRODUCTS HAVING ANGLED OPTICAL FIBERS

(71) Applicant: GLOBALFOUNDRIES U.S. Inc., Malta, NY (US)

(72) Inventors: Bartlomiej Jan Pawlak, Leuven (BE); Nicholas Polomoff, Hopewell Junction, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/510,329

(22) Filed: Oct. 25, 2021

(65) Prior Publication Data
US 2023/0127056 A1    Apr. 27, 2023

(51) Int. Cl.
*G02B 6/42* (2006.01)

(52) U.S. Cl.
CPC .................. *G02B 6/4243* (2013.01)

(58) Field of Classification Search
CPC .................................... G02B 6/4243
See application file for complete search history.

(56) References Cited

U.S. PATENT DOCUMENTS

| 5,787,214 | A | 7/1998 | Harpin et al. |
| 6,627,096 | B2 | 9/2003 | Sherrer et al. |
| 6,816,653 | B2 | 11/2004 | Botet et al. |
| 6,885,786 | B2 | 4/2005 | Steinberg et al. |
| 7,440,668 | B2 | 10/2008 | Colgan et al. |
| 7,859,084 | B2 | 12/2010 | Utsumi et al. |
| 9,323,010 | B2 | 4/2016 | Kosenko et al. |
| 2004/0190814 | A1 | 9/2004 | Suzuki |
| 2005/0284181 | A1 | 12/2005 | Smith et al. |
| 2009/0067787 | A1* | 3/2009 | Yamamoto ........... G02B 6/3636 385/50 |
| 2010/0142886 | A1* | 6/2010 | Warashina ............ G02B 6/423 257/E31.127 |
| 2011/0135265 | A1* | 6/2011 | Park ......................... G02B 6/13 216/2 |
| 2014/0037254 | A1* | 2/2014 | Wang .................... H04B 10/801 385/94 |
| 2015/0117821 | A1* | 4/2015 | Aoki ..................... G02B 6/3855 385/83 |

(Continued)

FOREIGN PATENT DOCUMENTS

WO    2002041507 A2    5/2002

OTHER PUBLICATIONS

Michal Rakowski et al., 145nm CMOS—Silicon Photonics Monolithic Technology (45CLO) for next-generation, low power and high speed optical interconnects, 2020 Optical Fiber Communications Conference and Exhibition (OFC), 2020, IEEE.

(Continued)

*Primary Examiner* — Sung H Pak
*Assistant Examiner* — Hoang Q Tran
(74) *Attorney, Agent, or Firm* — Anthony Canale (57) ABSTRACT

The disclosed subject matter relates generally to photonic integrated circuit chips, semiconductor assemblies or packagings, and a method of forming the same. More particularly, the present disclosure relates to placement of optical fibers on a photonics chip, and a semiconductor assembly including the photonics chip.

17 Claims, 8 Drawing Sheets

(56) References Cited

U.S. PATENT DOCUMENTS

2018/0019139 A1    1/2018    Sun et al.

OTHER PUBLICATIONS

Bo Peng et al., A CMOS Compatible Monolithic Fiber Attach Solution with Reliable Performance and Self-alignment, 2020 Optical Fiber Communications Conference and Exhibition (OFC), 2020, IEEE.
J.V. Galan et al., CMOS compatible silicon etched V-grooves integrated with a SOI fiber coupling technique for enhancing fiber-to-chip alignment, 2009 6th IEEE International Conference on Group IV Photonics, 2009, pp. 148-150 IEEE.
Ken Giewont et al., 300-mm Monolithic Silicon Photonics Foundry Technology, IEEE Journal of Selected Topics in Quantum Electronics, Sep.-Oct. 2019, vol. 25, Issue: 5, pp. 1-11, IEEE.
Philipsen, Anisotropy in the surface chemistry of silicon in alkaline solution, 2007, Utrecht University.

\* cited by examiner

PHOTONICS CHIPS AND SEMICONDUCTOR PRODUCTS HAVING ANGLED OPTICAL FIBERS

FIELD OF THE INVENTION

The disclosed subject matter relates generally to integrated circuit chips and semiconductor products for photonics applications. More particularly, the present disclosure relates to photonics chips having optical fibers angled with respect to edges of the chips. The present disclosure also relates to semiconductor products having those photonic chips and a method of forming the same.

BACKGROUND

Silicon photonics is a platform for potentially revolutionary advances in the fields of telecommunications, data communications, medical technology, security, quantum computing, and sensing. Silicon photonics has the potential to realize small, highly integrated, photonics sub-systems that leverage off the decades of silicon fabrication experience, technology, and scalability to gain access to the full potential of the silicon platform, i.e. silicon photonics for high-speed signaling and sensing, and complimentary metal-oxide semiconductor (CMOS) electronics for subsequent logical operations and computations. Such multi-chip integration also allows for the bridging of different functional technologies, such as micro-electro-mechanical systems (MEMS), III-V materials, non-CMOS application-specific integrated circuits (ASIC), etc.

Electromagnetics waves (e.g., light waves) can be transmitted from an external laser source into a photonics chip via a transmission medium, such as an optical fiber or optical fiber arrays. The development of small, efficient optical transmission lines, such as optical fibers, has led to widespread use of optical communication in many applications requiring, long distance and/or high data rate communication (e.g, telecommunications). Fiber optic transmission lines provide low cost, compact, low electromagnetic interference, and high-speed data transmission over significant distances.

SUMMARY

In an aspect of the present disclosure, there is provided a photonics integrated circuit (PIC) chip including a substrate having four edges, grooves defined on the substrate, the grooves include at least one groove positioned at each of the four edges of the substrate, in which the grooves form an acute angle with the respective edges of the substrate, and at least one optical fiber positioned on at least one of the four edges of the substrate, in which the at least one optical fiber is in one of the grooves.

In another aspect of the present disclosure, there is provided a semiconductor product including a first PIC chip and a second PIC chip above the first PIC chip. The first PIC chip includes a substrate having four edges, grooves defined on the substrate, the grooves include at least one groove positioned at each of the four edges of the substrate, in which the grooves form an acute angle with the respective edges of the substrate, at least one optical fiber positioned on at least one of the four edges of the substrate, in which the at least one optical fiber is in the one of the grooves.

In yet another aspect of the present disclosure, there is provided a method of forming a semiconductor product, the method including forming a PIC chip, the PIC chip including a substrate having four edges, forming grooves on the substrate, the grooves include at least one groove positioned at each of the four edges of the substrate, in which the grooves form an acute angle with the respective edges of the substrate, and positioning at least one optical fiber on at least one of the four edges of the substrate, in which the at least one optical fiber is in one of the grooves.

BRIEF DESCRIPTION OF THE DRAWINGS

The present disclosure may be understood by reference to the following description taken in conjunction with the accompanying drawings.

For simplicity and clarity of illustration, the drawings illustrate the general manner of construction, and certain descriptions and details of features and techniques may be omitted to avoid unnecessarily obscuring the discussion of the described embodiments of the present disclosure. Additionally, elements in the drawings are not necessarily drawn to scale. For example, the dimensions of some of the elements in the drawings may be exaggerated relative to other elements to help improve understanding of embodiments of the present disclosure. The same reference numerals in different drawings denote the same elements, while similar reference numerals may, but do not necessarily, denote similar elements.

DETAILED DESCRIPTION

Various illustrative embodiments of the present disclosure are described below. The embodiments disclosed herein are exemplary and not intended to be exhaustive or limiting to the present disclosure.

Figure 1:
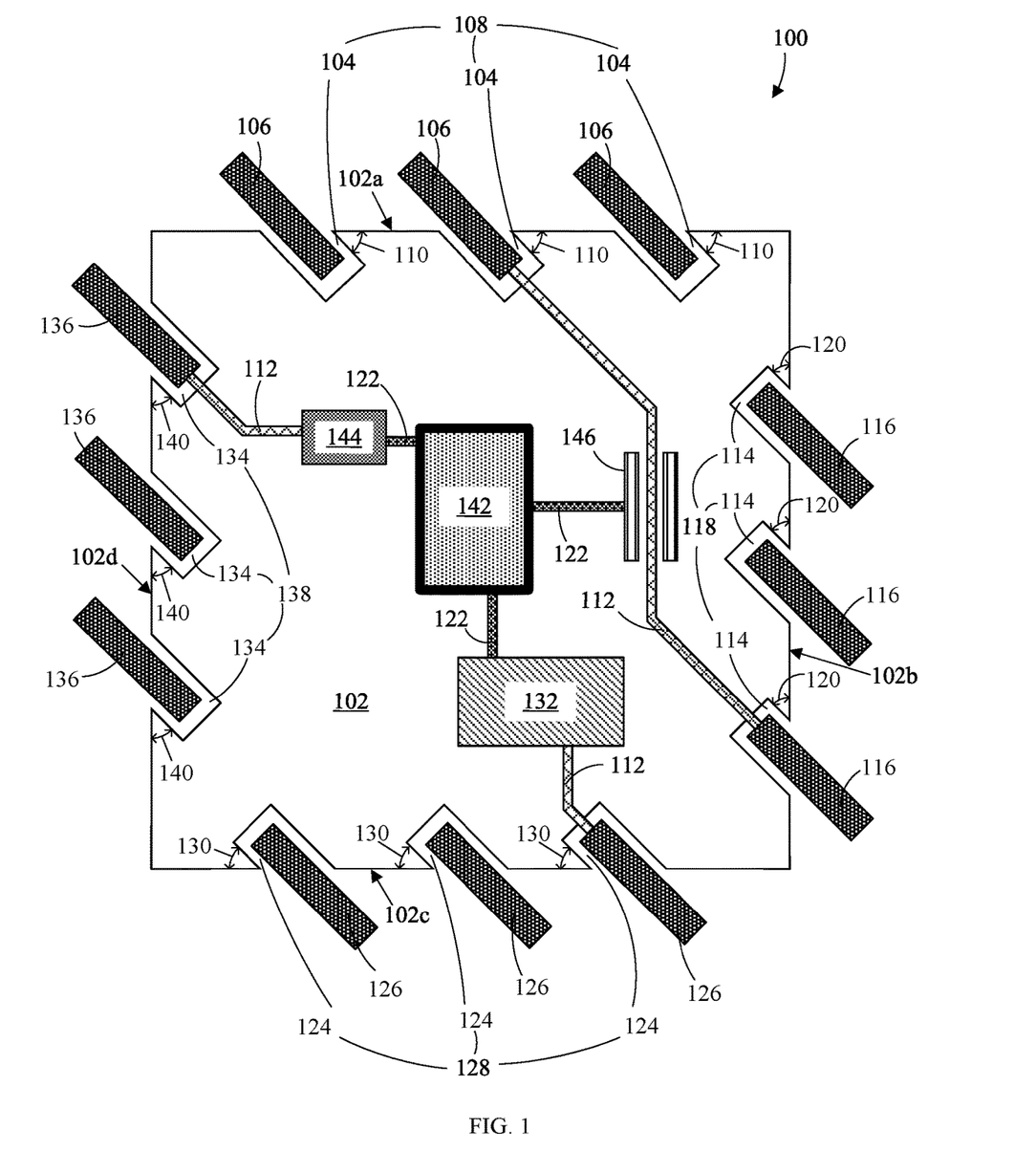
FIG. 1 is a top-down view of an exemplary IC chip in accordance with the present disclosure.

Referring to FIG. 1, an example of an IC chip 100 for photonics application is shown. The IC chip 100 may be a photonics integrated circuit (PIC) chip. The PIC chip includes a substrate 102 having four edges 102*a*, 102*b*, 102*c*, 102*d*. The substrate 102 may have a single crystalline structure, and may include any semiconductor material, such as silicon, germanium, silicon germanium (SiGe), silicon carbide, and those consisting essentially of III-V compound semiconductors, such as GaAs, II-VI compound semiconductors such as ZnSe. The substrate 102 may have a top surface. The top surface of the substrate 102 may have a rectangular or a square shape. The top surface of the substrate 102 may be oriented along an equivalent crystal plane of {100}, and preferably, a crystal plane of (100).

In a single crystal semiconductor material, all lattice directions and lattice planes in a unit cell of a single crystal material can be described by a mathematical description known as a Miller Index. The notation [hkl] in the Miller Index defines a crystal direction or orientation, such as the [001], [100], [010], [110], and [111] directions in a cubic unit cell of single crystal silicon. The crystal planes or facets of a single crystal silicon unit cell are defined by the notation (hkl) in the Miller Index, which refers to a particular crystal plane or facet that is perpendicular to the [hkl] direction. For example, the crystal planes (100), (110), and (111) of the single crystal silicon unit cells are respectively perpendicular to the [100], [110], and [111] directions. Moreover, because the unit cells are periodic in a semiconductor crystal, there exist families or sets of equivalent crystal directions and planes. The notation <hkl> in the Miller Index therefore defines a family or set of equivalent crystal directions or orientations. For example, the <100> directions include the equivalent crystal directions of [100], [010], and [001]; the <110> directions include the equivalent crystal directions of [110], [011], [101], [−1−10], [0−1−1], [−10−1], [−110], [0−11], [−101], [1−10], [01−1], and [10−1]; and the <111> directions include the equivalent crystal directions of [111], [−111], [1−11], and [11−1]. Similarly, the notation {hkl} defines a family or set of equivalent crystal planes or facets that are respectively perpendicular to the <hkl> directions. For example, the {100} planes include the set of equivalent crystal planes that are respectively perpendicular to the <100> directions. Correspondingly, the term "equivalent crystal planes" as used herein may refer to a family of equivalent crystal planes or facets as defined by the Miller Indexes, as described hereinabove.

Grooves 104,114,124,134 are defined on the substrate 102. For example, the grooves 104,114,124,134 may be recessed in the top surface of the substrate 102. The grooves 104,114, 124,134 include at least one groove positioned at each of the four edges 102a, 102b, 102c, 102d of the substrate 102. As an example, the substrate 102 may have a first edge 102a, a second edge 102b, a third edge 102c, and a fourth edge 102d. The first edge 102a may be positioned opposite to the third edge 102c, while the second edge 102b may be positioned opposite to the fourth edge 102d. The edges 102a, 102b, 102c, 102d of the substrate 102 may form a rectangular perimeter around the top surface of the substrate 102. A first array 108 of grooves 104 may be positioned at the first edge 102a of the substrate 102. A second array 118 of grooves 114 may be positioned at the second edge 102b of the substrate 102. A third array 128 of grooves 124 may be positioned at the third edge 102c of the substrate 102. A fourth array 138 of grooves 134 may be positioned at the fourth edge 102d of the substrate 102.

The grooves 104, 114, 124, 134 form an acute angle 110, 120, 130, 140 with the respective edges 102a, 102b, 102c, 102d of the substrate 102. In particular, each groove 104, 114, 124, 134 may have a longitudinal axis, and the longitudinal axis of each groove 104, 114, 124, 134 may form an acute angle with the respective edges 102a, 102b, 102c, 102d of the substrate 102. In some embodiments, the grooves 104, 114, 124, 134 may form an angle in the range of about 30 degrees to about 60 degrees with the respective edges 102a, 102b, 102c, 102d of the substrate. Preferably, the grooves 104, 114, 124, 134 may form an angle of about 45 degrees with the respective edges 102a, 102b, 102c, 102d of the substrate. The grooves 104, 114, 124, 134 may be aligned along an equivalent crystal direction of <110>. For example, the grooves 104, 114, 124, 134 may be aligned along a crystal direction of [110], a crystal direction of [−110], or a crystal direction of [1−10].

As shown in FIG. 1, the first array 108 of grooves 104 may form an acute angle 110 with the first edge 102a, the second array 118 of grooves 114 may form an acute angle 120 with the second edge 102b, the third array 128 of grooves 124 may form an acute angle 130 with the third edge 102c, and the fourth array 138 of grooves 134 may form an acute angle 140 with the fourth edge 102d. In an embodiment, the grooves 104, 114, 124, 134 positioned at the respective edges 102a, 102b, 102c, 102d of the substrate 102 may be substantially parallel with each other.

The PIC chip 100 may also include at least one optical fiber positioned in at least one of the four edges of the substrate, in which the at least one optical fiber is in one of the grooves. For example, as shown in FIG. 1, optical fibers 106 may be positioned at the first edge 102a, optical fibers 116 may be positioned at the second edge 102b, optical fibers 126 may be positioned at the third edge 102c, and optical fibers 136 may be positioned at the fourth edge 102d. The optical fibers 106, 116, 126, 136 may be placed in, mounted on, or attached to their respective grooves 104, 114, 124, 134. The optical fibers 106, 116, 126, 136 may form an acute angle with the respective edges 102a, 102b, 102c, 102d of the substrate 102. Although not shown, the optical fibers may include a core surrounded by a cladding material having a refractive index lower than that of the core. Both the core and the cladding material may be transparent to the light, i.e., have very low loss of the light.

Figure 2:
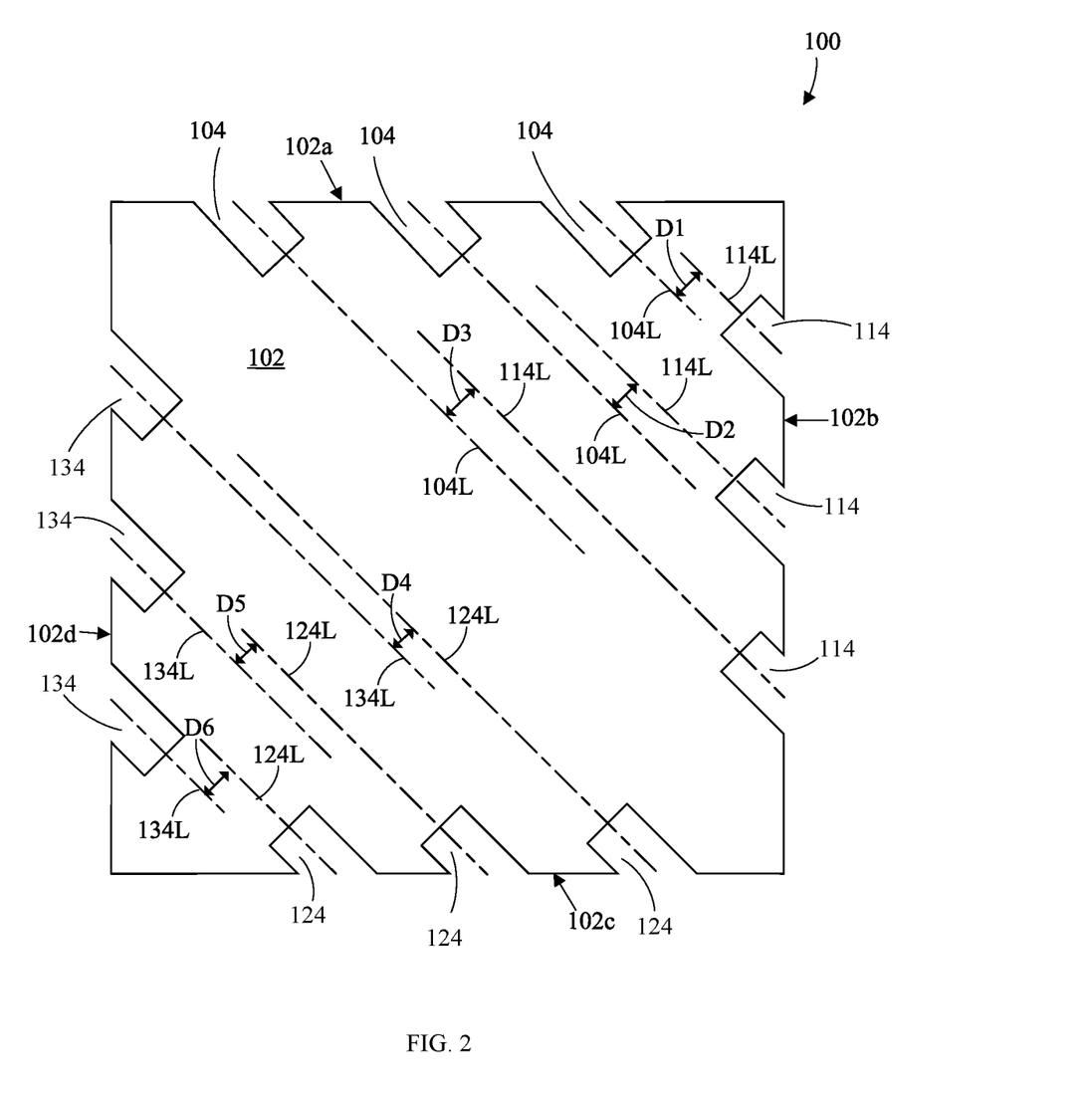
FIG. 2 is a simplified top-down view of the exemplary IC chip shown in FIG. 1, in accordance with the present disclosure.

FIG. 2 is a simplified top-down view of the IC chip 100 shown in FIG. 1 and illustrates the relative positioning of the grooves 104, 114, 124, 134 at the edges 102a, 102b, 102c, 102d of the substrate 102. For simplicity, only the grooves 104, 114, 124, 134 and the substrate 102 are illustrated. Preferably, the cores of the optical fibers positioned at an edge of the substrate may be offset from the cores of the optical fibers positioned at an opposite edge or an adjacent edge of the substrate. In the illustrative example shown in FIG. 2, the grooves 104 at the first edge 102a may be positioned offset from the grooves 114 at the adjacent second edge 102b such that the longitudinal axis 104L of each groove 104 does not align with the longitudinal axis 114L of each groove 114. In particular, the longitudinal axis 104L of the grooves 104 may be positioned offset from the longitudinal axis 114L of the grooves 114 by a lateral distance D1, D2, D3. Accordingly, the cores of the optical fibers 106 at the first edge 102a may therefore be positioned offset from the cores of the optical fibers 116 at the adjacent second edge 102b (i.e., no face-to-face alignment of the cores of the optical fibers 106 and 116). Likewise, the grooves 124 at the third edge 102c may be positioned offset from the grooves 134 at the adjacent fourth edge 102d such that the longitudinal axis 124L of each groove 124 does not align with the longitudinal axis 134L of each groove 134. In particular, the longitudinal axis 124L of the grooves 124 may be positioned offset from the longitudinal axis 134L of the grooves 134 by a lateral distance D4, D5, D6. Accordingly, the cores of the optical fibers 126 may therefore be positioned offset from the cores of the optical fibers 136.

Referring to FIG. 1 again, the PIC chip 100 may include various PIC devices formed above the substrate 102. For example, the PIC chip 100 may include photonics devices 132, 144, 146 formed above the substrate 102, and a logic device 142 formed above the substrate 102. In the embodiment shown in FIG. 1, the logic device 142 may be integrated into the first PIC chip 100. Alternatively, as will be shown in subsequent drawings, the logic device 142 may be integrated into a different chip from the first PIC chip 100.

Examples of the photonics devices may include, but are not limited to, a photodetector 132, a laser 144, and an optical modulator 146. The photonics devices 132, 144, 146 may be optically coupled to the optical fibers by waveguides 112. In some embodiments, the waveguides 112 may include bends. The logic device 142 may be electrically connected to the photonics devices 132, 144, 146 by interconnect structures (e.g., conductive lines 122). The logic device 142 may be configured as a "driver" device for controlling the operation of the photonics devices 132, 144, 146. Exemplary functions of a "driver" device for controlling the photonics devices may include optical signal read out, optical signal generation, optimization of photonics chip operation conditions, or data processing. As an example, the logic device 142 may send/receive electrical signals to/from the respective photonics device 132, 144, 146 connected thereto. In an embodiment, the logic device 142 may include a transistor such as, but is not limited to, planar field-effect transistor, fin-shaped field-effect transistor (FinFET), ferroelectric field-effect transistors (FeFET), CMOS transistor, and bi-polar junction transistor (BJT).

As shown in FIG. 1, optical fiber 126 may be optically coupled to photodetector 132 via waveguide 112. The optical fiber 126 may receive optical signals (i.e., electromagnetic waves such as light) from an external source, and then transmit the optical signals towards the waveguide 112. The optical signals may be propagated along the wave guide 112 towards the photodetector 132. The photodetector 132 may be electrically connected to the logic device 142 via conductive line 122. The photodetector 132 may convert the optical signals into electrical signals, in which the electrical signals may be transmitted via conductive line 122 towards the logic device 142.

Similarly, laser 144 may be electrically connected to the logic device 142 via conductive line 122. The laser 144 may receive electrical signals (e.g., current input) from the logic device 142 via conductive line 122. The laser 144 may convert the electrical signals into optical signals (e.g., light). Optical fiber 136 may be optically coupled to laser 144 via waveguide 112. The optical signals may be propagated along the waveguide 112 towards the optical fiber 136, and subsequently, transmitted out of the IC chip 100 via the optical fiber 136.

Optical fibers positioned at different edges of the substrate 102 may be in optical communication with each other. For example, optical fiber 106 positioned on the first edge 102a of the substrate 102 may be optically coupled to optical fiber 116 positioned on a second edge 102b of the substrate 102. As shown in FIG. 1, optical fiber 116 may be optically coupled to optical fiber 106 via waveguide 112. A portion of the waveguide 112 may pass through the optical modulator 146. The optical modulator 146 may modify or alter the optical signal propagated within the waveguide 112. For example, the optical modulator 146 may modify an incoming optical signal to produce a different outgoing optical signal by modulating the amplitude of the optical signal (i.e. light intensity).

For simplicity, not all optical fibers 106, 116, 126, 136 in FIG. 1 are illustrated as being optically coupled to photonics devices or each other. However, it should be understood that the IC chip 100 may include additional photonics devices, and that all of the optical fibers 106, 116, 126, 136 may be optically coupled to either the additional photonics devices or other optical fibers in the IC chip 100. Furthermore, more than one optical fiber may be optically coupled to a single photonics device in the IC chip 100. It should also be noted that the present disclosure contemplates embodiments where not all of the grooves in the substrate are filled with an optical fiber. In other words, it is possible for a groove in the substrate to be left unused (i.e., the groove does not have an optical fiber placed therein).

Advantageously, the positioning of at least one groove 104, 114, 124, 134 at each of the four edges 102a, 102b, 102c, 102d of the substrate 102 may enable all four edges 102a, 102b, 102c, 102d of the substrate 102 to be utilized for the placement, attachment, or mounting of optical fibers 106, 116, 126, 136. The utilization of all four edges 102a, 102b, 102c, 102d of the substrate 102 for attachment of optical fibers may provide increased points of entry/exit for the transmission of optical signals into/from the IC chip 100, thereby enabling the IC chip 100 to accommodate a larger number of distinct optical signals and achieve greater data density.

Figure 3:
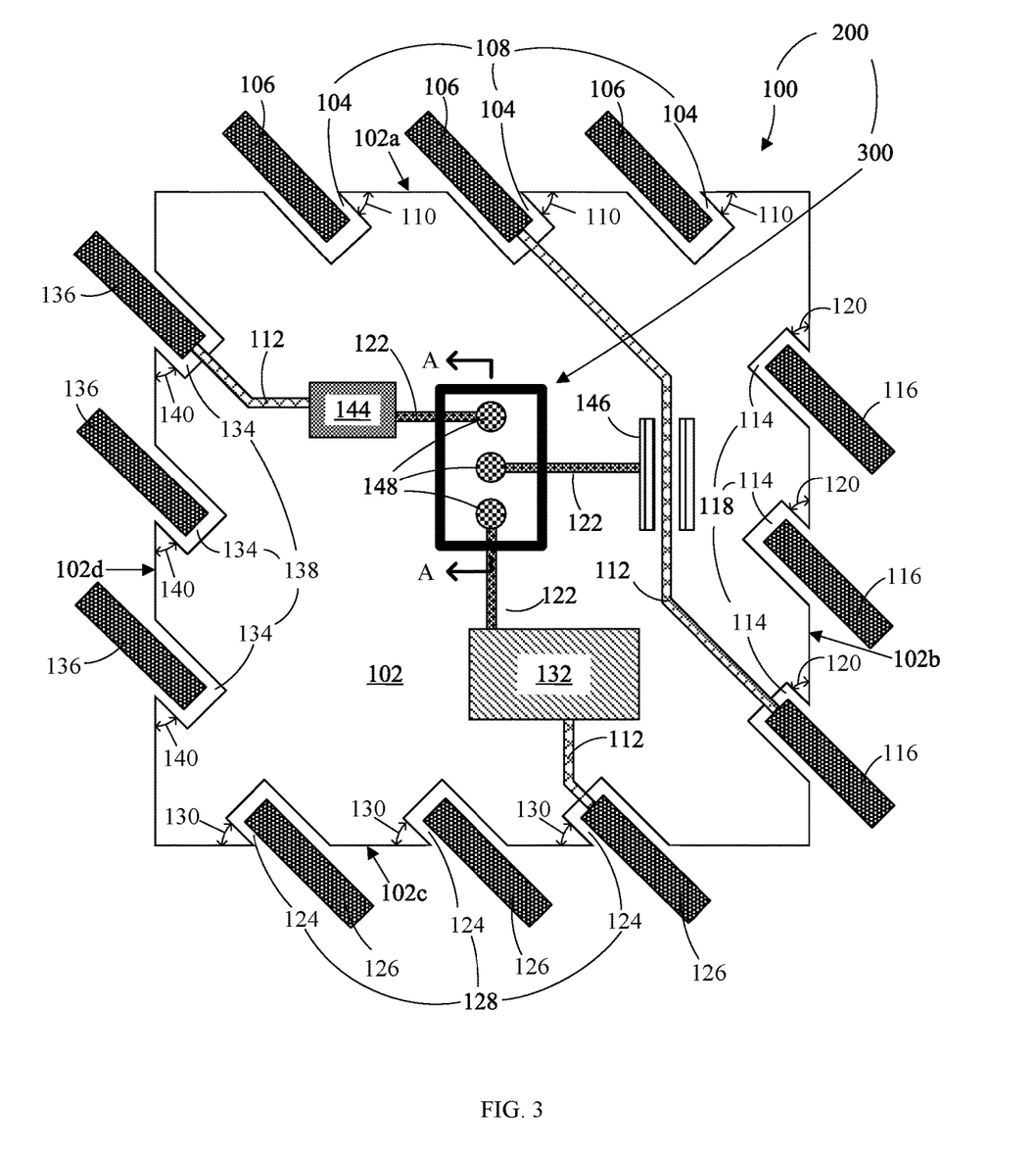
FIG. 3 is a top-down view of an exemplary semiconductor product in accordance with the present disclosure.

Referring to FIG. 3, in which like reference numerals refer to like features in FIG. 1, an example of a semiconductor product 200 for photonics application is shown. As used herein, the term "semiconductor product" may include a semiconductor "assembly" or a semiconductor "package". The semiconductor product 200 may include the first IC chip 100 as described in FIG. 1, and a second IC chip 300. The second IC chip 300 may be positioned above the first IC chip 100. In some embodiments, the second IC chip 300 may be bonded to the first IC chip by conductive bumps 148. For simplicity and clarity, the second IC chip 300 is outlined by a rectangle in FIG. 3 so as not to obscure the illustration of the conductive bumps 148 positioned underneath the second IC chip 300.

The second IC chip 300 may be electrically connected to the photonics devices 132, 144, 146 of the first IC chip 100. In particular, the second IC chip 300 may include a logic device (not shown) that is electrically connected to the photonics devices 132, 144, 146 of the first IC chip 100. The second IC chip 300 may be referred to as the "driver" chip described herein for controlling the operation of the photonics devices 132, 144, 146. For example, the logic device (not shown) in the second IC chip 300 may send/receive electrical signals to/from the respective photonics device 132, 144, 146 connected thereto. In an embodiment, the logic device (not shown) in the second IC chip 300 may include a transistor such as, but is not limited to, planar field-effect transistor, fin-shaped field-effect transistor (FinFET), ferroelectric field-effect transistors (FeFET), CMOS transistor, and bi-polar junction transistor (BJT). In some embodiments, the first IC chip 100 may be a PIC chip while the second IC chip 300 may be an electronic integrated circuit (EIC) chip.

Figure 4:
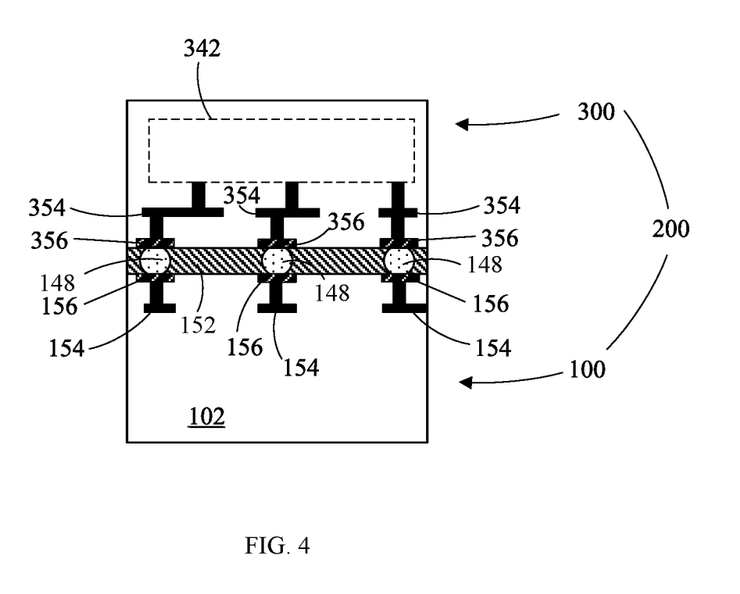
FIG. 4 is a cross-sectional view of the exemplary semiconductor product taken along the section line AA shown in FIG. 3, in accordance with the present disclosure.

FIG. 4 illustrates a cross-sectional view of the semiconductor product 200 along the section line AA shown in FIG. 3. Referring to FIG. 4, the second IC chip 300 may be positioned above the first IC chip 100. Various types of chip-to-chip interconnections (e.g., wire bonding, solder bumps, flip chip bonding, etc.) may be used to bond the first IC chip 100 with the second IC chip 300. In an embodiment, the first IC chip 100 may be bonded to the second IC chip 300 by conductive bumps 148. The first IC chip 100 and the second IC chip 300 may each have connection pads 156, 356. The conductive bumps 148 may be disposed on the connection pads 156 of the first IC chip 100. The second IC chip 300 may be positioned above the first IC chip 100 by having the connection pads 356 of the second IC chip 300 vertically aligned with the conductive bumps 148. The connection pads 356 of the second IC chip 300 may subsequently contact the conductive bumps 148, and the conductive bumps 148 may be reflowed to complete the bonding process. An underfill material 152 may be inserted between the first IC chip 100 and the second IC chip 300, e.g., by a capillary under-filling step.

The connection pads 156 of the first IC chip 100 may be in contact with interconnect structures 154 located in the back end of line (BEOL) portion of the first IC chip 100. Similarly, the connection pads 356 of the second IC chip 300 may be in contact with interconnect structures 354 located in the BEOL portion of the second IC chip 300. The second IC chip 300 may include a logic device 342. As described herein, the first IC chip 100 may include photonics devices (not shown) formed above the substrate 102 of the first IC chip 100. The logic device 342 may be electrically connected to the photonics devices (not shown) in the first IC chip 100 via the interconnect structures 354 of the second IC chip 300, the conductive bumps 148, and the interconnect structures 154 of the first IC chip 100. Although not shown in the accompanying drawings, the semiconductor product 200 may be assembled on a laminate, a printed circuit board, or an interposer.

Figure 5:
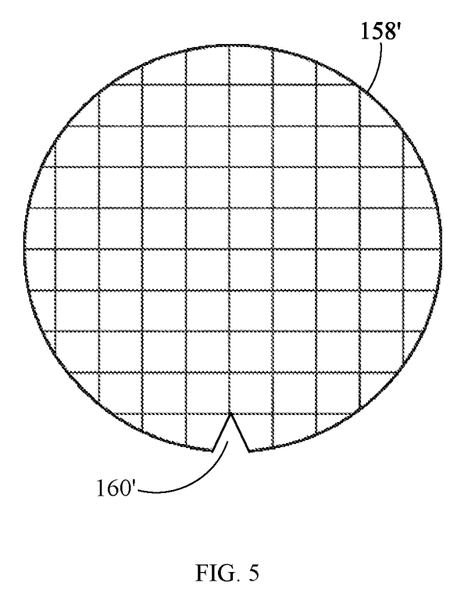
FIG. 5 is a top-down view depicting a conventional wafer.

FIG. 5 illustrates a conventional wafer 158' obtained during the fabrication of semiconductor devices. The wafer 158' may have a crystallographic surface orientation along a (100) plane and include a notch 160' at its edge. The notch 160' may be aligned along an equivalent crystal direction of <110>. The wafer 158' may be diced to form IC chips or dies that have its edges being either parallel or perpendicular to the equivalent crystal direction of <110>.

Figure 6:
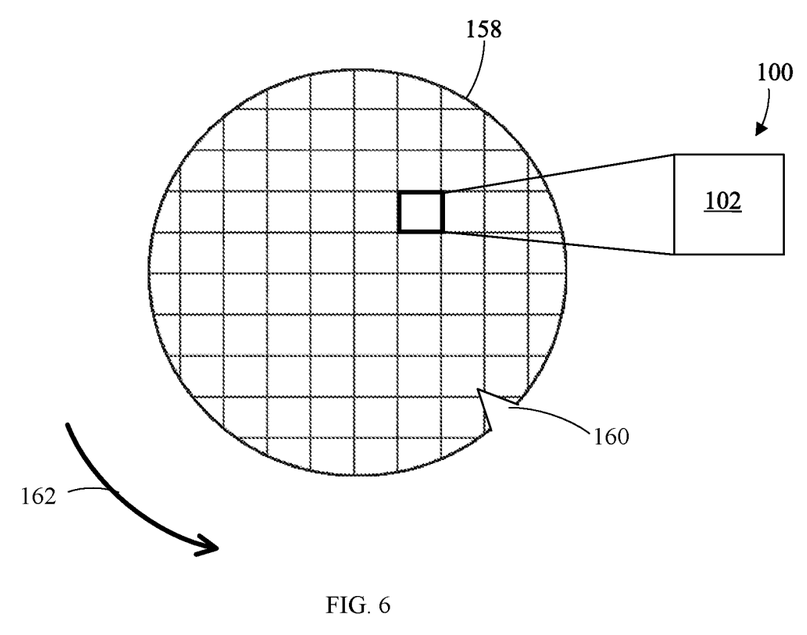
FIG. 6, FIG. 7A, and FIG. 7B are top-down views depicting a set of steps for fabricating an exemplary semiconductor product, in accordance with the present disclosure.
Figure 7A:
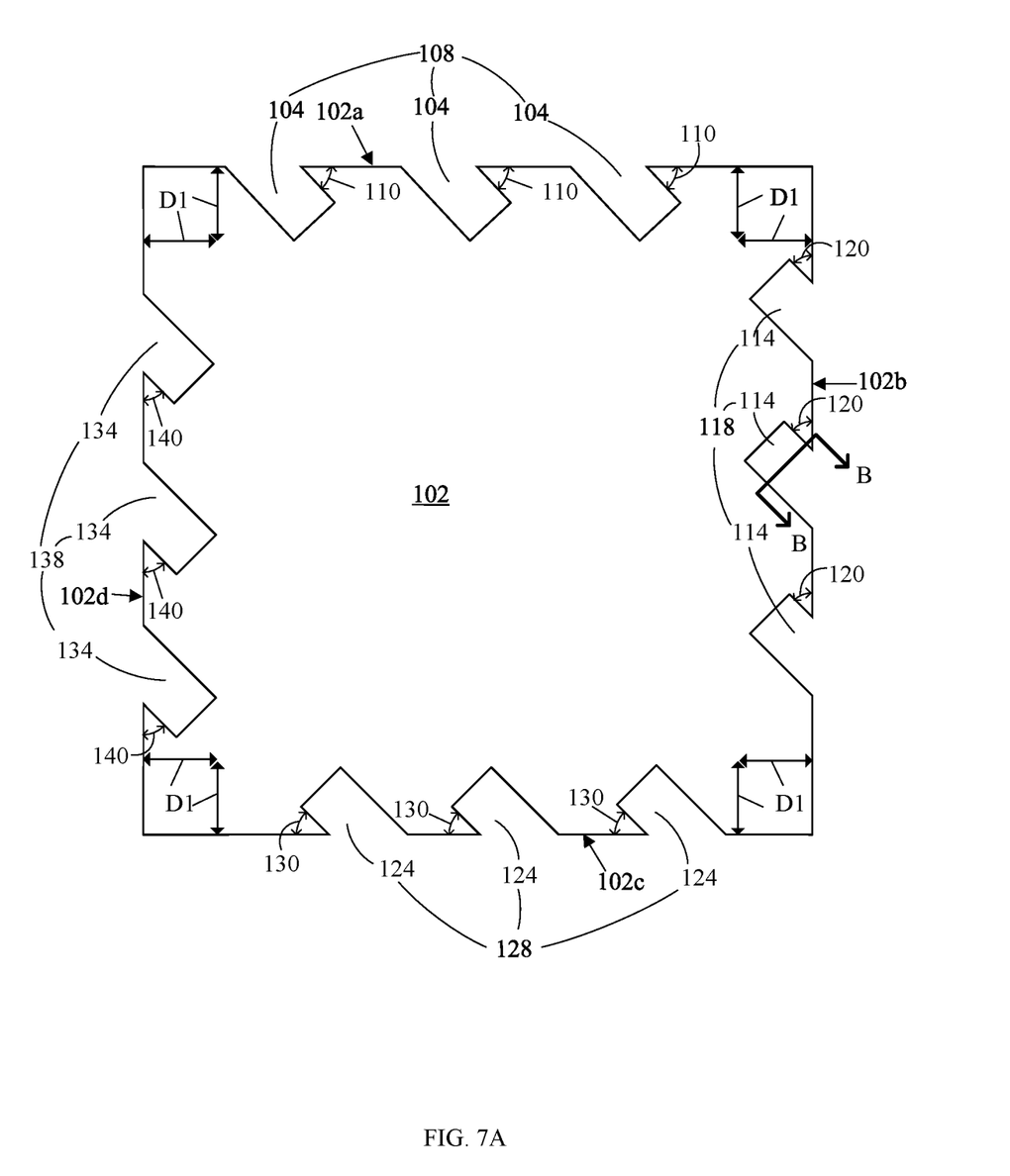
Figure 7B:
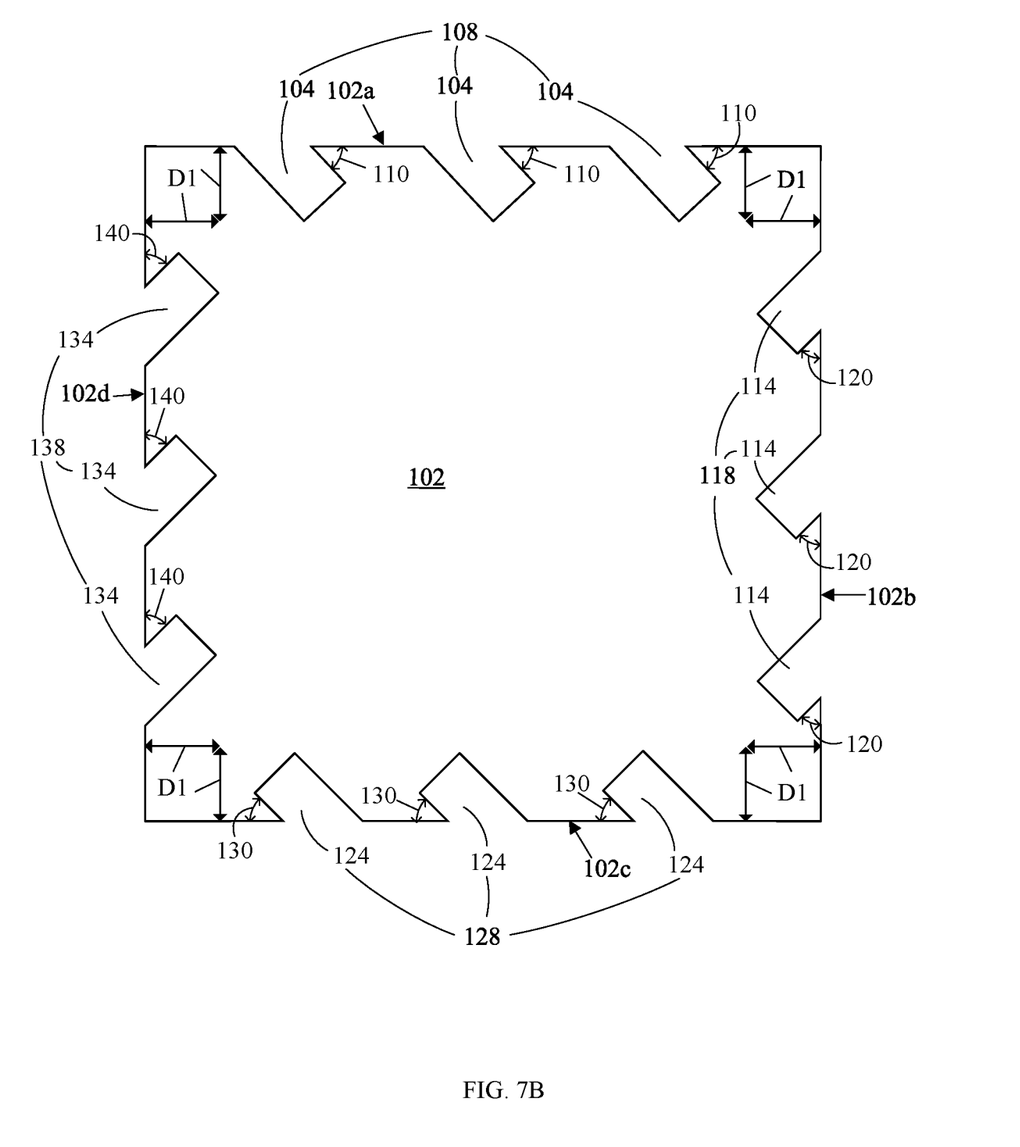

FIGS. 6, 7A, and 7B show a set of steps that may be used to create the IC chip and the semiconductor product as provided for in embodiments of the present disclosure.

As used herein, "deposition techniques" refer to the process of applying a material over another material (or the substrate). Exemplary techniques for deposition include, but are not limited to, spin-on coating, sputtering, chemical vapor deposition (CVD), physical vapor deposition (PVD), molecular beam deposition (MBD), pulsed laser deposition (PLD), liquid source misted chemical deposition (LSMCD), atomic layer deposition (ALD).

Additionally, "patterning techniques" include deposition of material or photoresist, patterning, exposure, development, etching, cleaning, and/or removal of the material or photoresist as required in forming a described pattern, structure, or opening. Examples of techniques for patterning include, but are not limited to, wet etch lithographic processes, dry etch lithographic processes, or direct patterning processes. Such techniques may use mask sets and mask layers.

FIG. 6 illustrates a wafer 158 obtained during the fabrication of semiconductor structures and devices, in accordance with the present disclosure. Examples of devices fabricated in the wafer 158 may include photonics devices (not shown) and logic devices (not shown). The wafer 158 may include a semiconductor material with a single crystalline structure. The wafer 158 may have a crystallographic surface orientation along a (100) plane, and may further include a notch 160 at its edge. Unlike the conventional wafer 158' shown in FIG. 5, in the present disclosure, the wafer 158 may be rotated about a center axis perpendicular to its (100) crystal plane. The wafer 158 may be rotated in either a clockwise (not shown) or an anti-clockwise direction 162. The wafer 158 may be rotated by an angle in the range of about 30 degrees to about 60 degrees, or preferably, an angle of about 45 degrees. In an example, the wafer 158 may be rotated such that its notch 160 may be aligned along an equivalent crystal direction of <110>.

The wafer 158 may be subsequently patterned using the patterning techniques described herein. For example, a photoresist layer (not shown) may be defined on a top surface of the wafer 158. The top surface of the wafer 158 may be subsequently etched using an isotropic etch, or an anisotropic etch (i.e., directional etching) to form grooves on the top surface of the wafer 158. In an embodiment, the top surface of the wafer 158 may be etched to define grooves that are aligned along the equivalent crystal direction of <110>.

In an embodiment, the wafer 158 may be preferably etched using an anisotropic etch, such as reactive ion etching, or plasma etching. The etching process may etch the semiconductor material in the wafer 158 along a direction perpendicular to the top surface of the wafer 158. Additionally, the anisotropic etch may etch the semiconductor material at different etching rates along different crystallographic directions and planes. In other words, certain crystal plane orientations in the wafer 158 are more resistant to etching than other crystal plane orientations in the wafer 158. In another embodiment, the wafer 158 may be etched using an isotropic etch (e.g., using a wet etching). In a wet etching process, a wet etchant selected from the group consisting of ammonia, tetramethylammonium hydroxide (TMAH), potassium hydroxide (KOH), ethylenediamine pyrocatechol (EDP), and a combination thereof may be used.

The wafer 158 may be subsequently diced to form numerous dies, such as the IC chip 100. Each die diced from the wafer 158, such as the IC chip 100, may include a substrate 102 having four edges. Unlike the conventional wafer 158' shown in FIG. 5, in the present disclosure, the wafer 158 may be diced such that the edges of the resulting IC chip 100 form an acute angle with respect to the equivalent crystal direction of <110>.

FIG. 7A and FIG. 7B illustrate various examples of grooves 104, 114, 124, 134 formed on the substrate 102 of the IC chip. Referring to FIG. 7A and FIG. 7B, the substrate 102 has a first edge 102a, a second edge 102b, a third edge 102c, and a fourth edge 102d. A first array 108 of grooves 104 may be formed at the first edge 102a of the substrate 102. A second array 118 of grooves 114 may be formed at the second edge 102b of the substrate 102. A third array 128 of grooves 124 may be formed at the third edge 102c of the substrate 102. A fourth array 138 of grooves 134 may be formed at the fourth edge 102d of the substrate 102. Depending on design rules and requirements, each array of grooves may be spaced apart from the respective adjacent edges of the substrate 102. For example, the first array 108 of grooves 104 may be spaced apart from adjacent edges 102b and 102d by a distance D1. Similarly, the second array 118 may be spaced apart from adjacent edges 102a and 102c by the distance D1, the third array 128 may be spaced apart from adjacent edges 102b and 102d by the distance D1, and the fourth array 138 may be spaced apart from adjacent edges 102a and 102c by the distance D1.

The wafer 158 shown in FIG. 6 may be etched to have the grooves 104, 114, 124, 134 form an acute angle 110, 120, 130, 140 with the respective edges 102a, 102b, 102c, 102d of the substrate 102. In the embodiment shown in FIG. 7A, the grooves 104, 114, 124, 134 at the respective edges 102a, 102b, 102c, 102d of the substrate 102 may be substantially parallel with each other. In particular, the grooves 104, 114, 124, 134 may form the same angles with their respective edges 102a, 102b, 102c, 102d, and the grooves 104, 114, 124, 134 may be aligned along the same equivalent crystal direction (e.g., <110>). For example, grooves 104 form an acute angle 110 with edge 102a, grooves 114 form an acute angle 120 with edge 102b, grooves 124 form an acute angle 130 with edge 102c, and grooves 134 form an acute angle 140 with edge 102d, in which the angles 110, 120, 130, 140 may have the same value.

In the embodiment shown in FIG. 7B, the first array 108 of grooves 104 and the third array 128 of grooves 124 may be aligned along a different crystal direction from the second array 118 of grooves 114 and the fourth array 138 of grooves 134. The grooves 104, 114, 124, 134 may also form angles 110, 120, 130, 140 with the edges 102a, 102b, 102c, 102d that are of the same value. For example, the grooves 104, 124 may be aligned along a crystal direction of [110] while the grooves 114, 134 may be aligned along a crystal direction of [1−10]. The grooves 104, 114, 124, 134 may also form an acute angle of about 45 degrees with the respective edges 102a, 102b, 102c, 102d. To form the embodiment shown in FIG. 7B, the wafer 158 may be rotated twice and patterned twice. For example, the wafer 158 in FIG. 6 may be rotated a first time and then patterned to form the grooves 104, 124. Subsequently, the wafer 158 may be rotated a second time about an axis perpendicular to its top surface and then patterned to form the grooves 114, 134.

The embodiments shown in FIG. 7A and FIG. 7B may undergo further processing. For example, optical fibers may be attached to, mounted in, or placed on the grooves 104, 114, 124, 134. The IC chip 100 may include waveguides above the substrate 102 for alignment with the optical fibers in the grooves 104, 114, 124, 134. Although not shown, the optical fibers may include a core surrounded by a cladding material having a refractive index lower than that of the core. The optical fibers may have their cores aligned with the waveguides in the substrate 102.

Figure 8A:
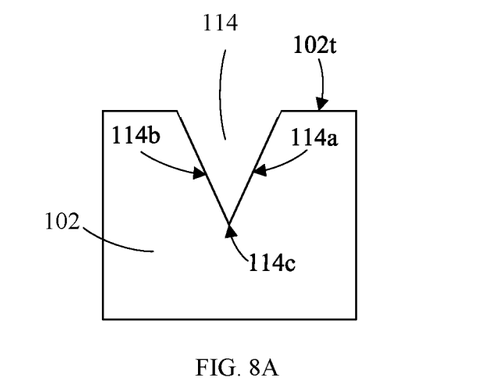
FIG. 8A through FIG. 8C are exemplary cross-sectional views of a groove shown in FIG. 7A, in accordance with the present disclosure.
Figure 8B:
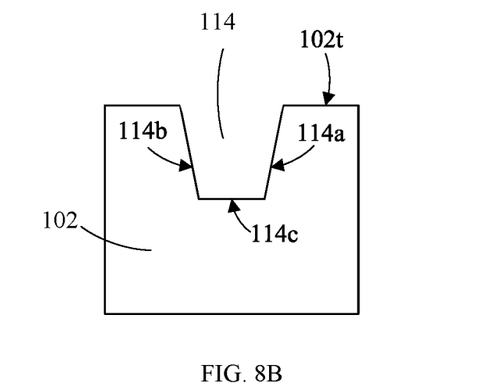
Figure 8C:
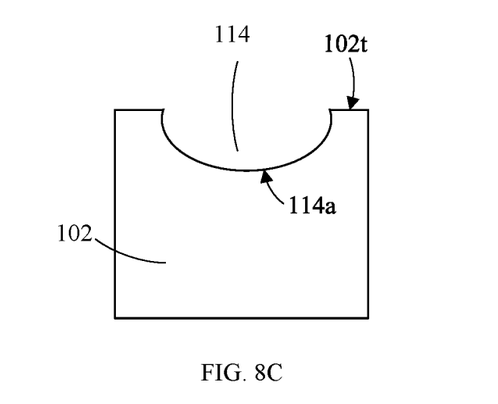

The grooves 104, 114, 124, 134 described in the present disclosure may have various cross-sectional shapes. FIG. 8A, FIG. 8B, and FIG. 8C illustrate exemplary cross-sectional views of the groove 114 taken along section line BB shown in FIG. 7A. Referring to FIG. 8A, the groove 114 in the substrate 102 may have sides 114a, 114b and a bottom edge 114c. The sides 114a, 114b may taper towards each other to meet at the bottom edge 114c. The sides 114a, 114b may be oriented along an equivalent crystal plane of {111}. The groove 114 shown in FIG. 8A may be referred to as a "V-groove" or a "V-shaped" groove. As an example, the V-groove 114 may be formed in a top surface 102t of the substrate 102, the top surface 102t being oriented to an equivalent crystal plane of {100}, by performing an anisotropic etch. The etching reaction may proceed in an equivalent crystal direction of <100> and the etch rate may be slower when the etching front hits the equivalent crystal planes of {111}. In other words, the etch rate of the equivalent crystal plane of {100} may be faster than the etch rate of the equivalent crystal plane of {111}.

Referring to FIG. 8B, the groove 114 may have sides 114a, 114b and a bottom surface 114c. The sides 114a, 114b may taper towards each other to meet at the bottom surface 114c. The sides 114a, 114b may be oriented along equivalent crystal planes of {111} and the bottom surface 114c may be oriented along an equivalent crystal plane of {100}. Alternatively, in another embodiment (not shown), the sides 114a, 114b may not taper towards each other, and instead, the sides 114a, 114b may be substantially vertical. Referring to FIG. 8C, the groove 114 may be formed with a concave surface 114a. The concave surface 114a of the groove 114 may be formed by performing a wet etch on the wafer 158 shown in FIG. 6.

Throughout this disclosure, it is to be understood that if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of elements is not necessarily limited to those elements, but may include other elements not expressly listed or inherent to such process, method, article, or device. Occurrences of the phrase "in an embodiment" herein do not necessarily all refer to the same embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Furthermore, there is no intention to be bound by any theory presented in the preceding background or the following detailed description. Additionally, the various tasks and processes described herein may be incorporated into a more comprehensive procedure or process having additional functionality not described in detail herein.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

As will be readily apparent to those skilled in the art upon a complete reading of the present application, the disclosed semiconductor chips, products, and methods of forming the same may be employed in manufacturing a variety of different integrated circuit products and packaging modules, including, but not limited to, photonics modules, optical communication systems, etc.

What is claimed is:

1. A photonic integrated circuit (PIC) chip comprising:
a substrate having a first edge, a second edge adjacent to the first edge, a third edge opposite to the first edge, and a fourth edge opposite to the second edge;
grooves in the substrate, the grooves comprising:
a first array of grooves positioned at the first edge of the substrate;
a second array of grooves positioned at the second edge of the substrate, wherein the first array of grooves at the first edge is parallel to the second array of grooves at the second edge;
a third array of grooves positioned at the third edge of the substrate;
a fourth array of grooves positioned at the fourth edge of the substrate, wherein the first array of grooves, the second array of grooves, the third array of grooves, and the fourth array of grooves form an acute angle with the respective first, second, third, and fourth edges of the substrate; and
at least one optical fiber positioned on at least one of the first, second, third, and fourth edges of the substrate, wherein the at least one optical fiber is in one of the first array of grooves, the second array of grooves, the third array of grooves, and the fourth array of grooves.

2. The PIC chip of claim 1, wherein each groove in the first array of grooves, the second array of grooves, the third array of grooves, and the fourth array of grooves has a longitudinal axis, and the longitudinal axis of each groove forms the acute angle with the respective first, second, third, and fourth edges of the substrate.

3. The PIC chip of claim 1, wherein the acute angle formed by the first array of grooves, the second array of grooves, the third array of grooves, and the fourth array of grooves with the respective first, second, third, and fourth edges of the substrate is in the range of 30 degrees to 60 degrees.

4. The PIC chip of claim 3, wherein the acute angle is of 45 degrees by the first array of grooves, the second array of grooves, the third array of grooves, and the fourth array of grooves with the respective first, second, third, and fourth edges of the substrate.

5. The PIC chip of claim 1, wherein the third array of grooves at the third edge is parallel to the fourth array of grooves at the fourth edge.

6. The PIC chip of claim 1, wherein the substrate has a single crystalline structure.

7. The PIC chip of claim 6, wherein the substrate has a top surface, and the top surface is oriented to a crystal plane of (100).

8. The PIC chip of claim 7, wherein the grooves are aligned along an equivalent crystal direction of <110>.

9. The PIC chip of claim 1, further comprising:
photonics devices above the substrate; and
a logic device above the substrate, wherein the logic device is electrically connected to the photonics devices.

10. The PIC chip of claim 9, further comprising a waveguide above the substrate, wherein the waveguide is optically coupled to the at least one optical fiber.

11. The PIC chip of claim 10, wherein the photonics devices comprise a photodetector above the substrate, wherein the photodetector is optically coupled to the waveguide.

12. The PIC chip of claim 10, wherein the photonics devices comprise a laser above the substrate, wherein the laser is optically coupled to the waveguide.

13. A semiconductor product comprising:
a first IC chip comprising:
a substrate having a first edge, a second edge adjacent to the first edge, a third edge opposite to the first edge, and a fourth edge opposite to the second edge;
grooves in the substrate, the grooves comprising:
a first array of grooves positioned at the first edge of the substrate;
a second array of grooves positioned at the second edge of the substrate, wherein the first array of grooves at the first edge is parallel to the second array of grooves at the second edge;
a third array of grooves positioned at the third edge of the substrate;
a fourth array of grooves positioned at the fourth edge of the substrate, and wherein the first array of grooves, the second array of grooves, the third array of grooves, and the fourth array of grooves form an acute angle with the respective first, second, third, and fourth edges of the substrate; and
at least one optical fiber positioned on at least one of the first, second, third, and fourth edges of the substrate, wherein the at least one optical fiber is in one of the first array of grooves, the second array of grooves, the third array of grooves, and the fourth array of grooves; and
a second IC chip above the first IC chip.

14. The semiconductor product of claim 13, wherein the first IC chip comprises photonic devices above the substrate, and the second IC chip comprises a logic device, and wherein the logic device of the second IC chip is electrically connected to the photonic devices of the first IC chip.

15. The semiconductor product of claim 14, wherein the photonic devices include a photodetector and a laser.

16. The semiconductor product of claim 13, wherein the second IC chip is bonded to the first IC chip by conductive bumps.

17. A method of forming a semiconductor product, the method comprising:
forming a PIC chip, the PIC chip comprises a substrate having a first edge, a second edge adjacent to the first edge, a third edge opposite to the first edge, and a fourth edge opposite to the second edge;
forming grooves in the substrate, the grooves comprising:
a first array of grooves positioned at the first edge of the substrate;
a second array of grooves positioned at the second edge of the substrate, wherein the first array of grooves at the first edge is parallel to the second array of grooves at the second edge;
a third array of grooves positioned at the third edge of the substrate;
a fourth array of grooves positioned at the fourth edge of the substrate, and wherein the first array of grooves, the second array of grooves, the third array of grooves, and the fourth array of grooves form an acute angle with the respective first, second, third, and fourth edges of the substrate; and
positioning at least one optical fiber on at least one of the first, second, third, and fourth edges of the substrate, wherein the at least one optical fiber is in one of the first array of grooves, the second array of grooves, the third array of grooves, and the fourth array of grooves.

\* \* \* \* \*